United States Patent
Nakai (10) Patent No.: US 10,108,007 B2
(45) Date of Patent: Oct. 23, 2018

(54) LASER SCANNING DEVICE, IMAGE FORMING APPARATUS AND REFLECTION SURFACE IDENTIFICATION METHOD FOR IDENTIFYING REFLECTION SURFACE OF ROTARY POLYGON MIRROR

(71) Applicant: KYOCERA Document Solutions Inc., Osaka-shi, Osaka (JP)

(72) Inventor: Jun Nakai, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/687,215

(22) Filed: Aug. 25, 2017

(65) Prior Publication Data

US 2018/0059410 A1    Mar. 1, 2018

(30) Foreign Application Priority Data

Aug. 26, 2016 (JP) ................... 2016-166215

(51) Int. Cl.
*G02B 26/12* (2006.01)
*G03G 15/04* (2006.01)
*G03G 15/043* (2006.01)

(52) U.S. Cl.
CPC ........... *G02B 26/127* (2013.01); *G02B 26/12* (2013.01); *G02B 26/121* (2013.01); *G03G 15/043* (2013.01)

(58) Field of Classification Search
CPC .... G03G 15/043; G02B 26/12; G02B 26/121; G02B 26/127
See application file for complete search history.

(56) References Cited

U.S. PATENT DOCUMENTS

| | | | |
|---|---|---|---|
| 2013/0222508 A1 | 8/2013 | Ogasahara | |
| 2017/0010558 A1 | 1/2017 | Ishidate et al. | |
| 2017/0343922 A1* | 11/2017 | Kyogoku | G02B 26/127 |
| 2018/0017889 A1* | 1/2018 | Seki | G03G 15/043 |
| 2018/0024461 A1* | 1/2018 | Hotogi | G03G 15/043 |

FOREIGN PATENT DOCUMENTS

| | | |
|---|---|---|
| EP | 2631700 A1 | 8/2013 |
| JP | 2007078723 A | 3/2007 |
| JP | 2013174751 A | 9/2013 |
| WO | 2015159992 A1 | 10/2015 |

* cited by examiner

*Primary Examiner* — Sophia S Chen
(74) *Attorney, Agent, or Firm* — Alleman Hall Creasman & Tuttle LLP (57) ABSTRACT

A laser scanning device includes a rotary polygon mirror, a drive motor, a light detecting portion, a measurement processing portion, and an identification processing portion. The rotary polygon mirror has reflection surfaces and rotates such that light is scanned by the reflection surfaces in sequence. The light detecting portion detects the light scanned by the rotary polygon mirror. The measurement processing portion, in each of light detection cycles, measures an interval between a light detection timing and an output timing at which a drive signal that is to be input to a drive motor first after the detection timing, is output. The identification processing portion identifies a reflection surface corresponding to a standard interval, based on the standard interval and the measured interval, the standard interval being one of intervals acquired in the detection cycles that correspond to the reflection surfaces.

7 Claims, 6 Drawing Sheets

LASER SCANNING DEVICE, IMAGE FORMING APPARATUS AND REFLECTION SURFACE IDENTIFICATION METHOD FOR IDENTIFYING REFLECTION SURFACE OF ROTARY POLYGON MIRROR

INCORPORATION BY REFERENCE

This application is based upon and claims the benefit of priority from the corresponding Japanese Patent Application No. 2016-166215 filed on Aug. 26, 2016, the entire contents of which are incorporated herein by reference.

BACKGROUND

The present disclosure relates to a laser scanning device including a rotary polygon mirror, an image forming apparatus including a laser scanning device, and a reflection surface identification method executed in a laser scanning device.

In an electrophotographic image forming apparatus, such as a printer, for forming an image, light emitted from a light source based on image data is scanned over a photoconductor drum by a rotary polygon mirror, and an electrostatic latent image corresponding to the image data is formed on the photoconductor drum. In this type of image forming apparatus, a light emission timing corresponding to each line of image data, namely, an electrostatic latent image writing timing is determined based on a light detection timing at which the light emitted from the light source and scanned by the rotary polygon mirror is detected by a light detecting portion.

In addition, there is known a conventional technique configured to identify a reflection surface of the rotary polygon mirror based on the light detection timing at which the light is detected by the light detecting portion, and an output timing at which a drive signal that is to be input to a drive motor first after the detection timing, is output. Specifically, it is monitored in each of predetermined division periods in a light detection cycle of the light detecting portion whether or not the drive signal is output, and the reflection surface of the polygon mirror is identified based on whether or not output of the drive signal was detected in a certain division period that corresponds to a certain reflection surface, or in any of division periods before and after the certain division period. This makes it possible to identify a reflection surface of the polygon mirror even in a case where the interval between the light detection timing detected by the light detecting portion and the drive signal output timing has been shifted due to environmental variations.

SUMMARY

A laser scanning device according to an aspect of the present disclosure includes a light source, a rotary polygon mirror, a drive motor, a light detecting portion, a measurement processing portion, and an identification processing portion. The rotary polygon mirror has a plurality of reflection surfaces that reflect light emitted from the light source, and rotates such that the light is scanned by the plurality of reflection surfaces in sequence. The drive motor has magnetic poles of a number that is mutually prime to and larger than a number of the reflection surfaces, and causes the rotary polygon mirror to rotate. The light detecting portion detects the light scanned by the rotary polygon mirror, at a predetermined detection position inside a scanning area in which the rotary polygon mirror scans the light. The measurement processing portion, in each of a plurality of detection cycles in which the light is detected by the light detecting portion, measures, as a measured interval, an interval between a detection timing at which the light is detected by the light detecting portion and an output timing at which a drive signal that is to be input to a drive motor first after the detection timing, is output. The identification processing portion identifies, from among the plurality of reflection surfaces, a reflection surface that corresponds to a predetermined standard interval, based on the predetermined standard interval and the measured interval, the predetermined standard interval being one of a plurality of intervals, excluding a shortest interval and a longest interval, that are respectively acquired in the plurality of detection cycles that respectively correspond to the plurality of reflection surfaces, each of the plurality of intervals being an interval between the detection timing and the output timing.

An image forming apparatus according to another aspect of the present disclosure includes the laser scanning device.

A reflection surface identification method according to a further aspect of the present disclosure is executed in a laser scanning device including a light source, a rotary polygon mirror having a plurality of reflection surfaces that reflect light emitted from the light source and configured to rotate such that the light is scanned by the plurality of reflection surfaces in sequence, a drive motor having magnetic poles of a number that is mutually prime to and larger than a number of the reflection surfaces and configured to cause the rotary polygon mirror to rotate, and a light detecting portion configured to detect the light scanned by the rotary polygon mirror, at a predetermined detection position inside a scanning area in which the rotary polygon mirror scans the light. The reflection surface identification method includes a measurement step and an identification step. In the measurement step, in each of a plurality of detection cycles in which the light is detected by the light detecting portion, an interval between a detection timing at which the light is detected by the light detecting portion and an output timing at which a drive signal that is to be input to a drive motor first after the detection timing, is output, is measured as a measured interval. In the identification step, a reflection surface that corresponds to a predetermined standard interval is identified from among the plurality of reflection surfaces based on the predetermined standard interval and the measured interval, the predetermined standard interval being one of a plurality of intervals, excluding a shortest interval and a longest interval, that are respectively acquired in the plurality of detection cycles that respectively correspond to the plurality of reflection surfaces, each of the plurality of intervals being an interval between the detection timing and the output timing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Outlined Configuration of Image Forming Apparatus 10]

First, an outlined configuration of an image forming apparatus 10 according to an embodiment of the present disclosure is described with reference to FIG. 1 and FIG. 2. Here, FIG. 1 is a schematic cross-sectional view showing the configuration of the image forming apparatus 10.

The image forming apparatus 10 is a multifunction peripheral having a plurality of functions such as a scan function for reading image data from a document sheet, a print function for forming an image based on image data, a facsimile function, and a copy function. It is noted that the present disclosure is applicable to image forming apparatuses such as a printer device, a facsimile device, and a copier.

Figure 1:
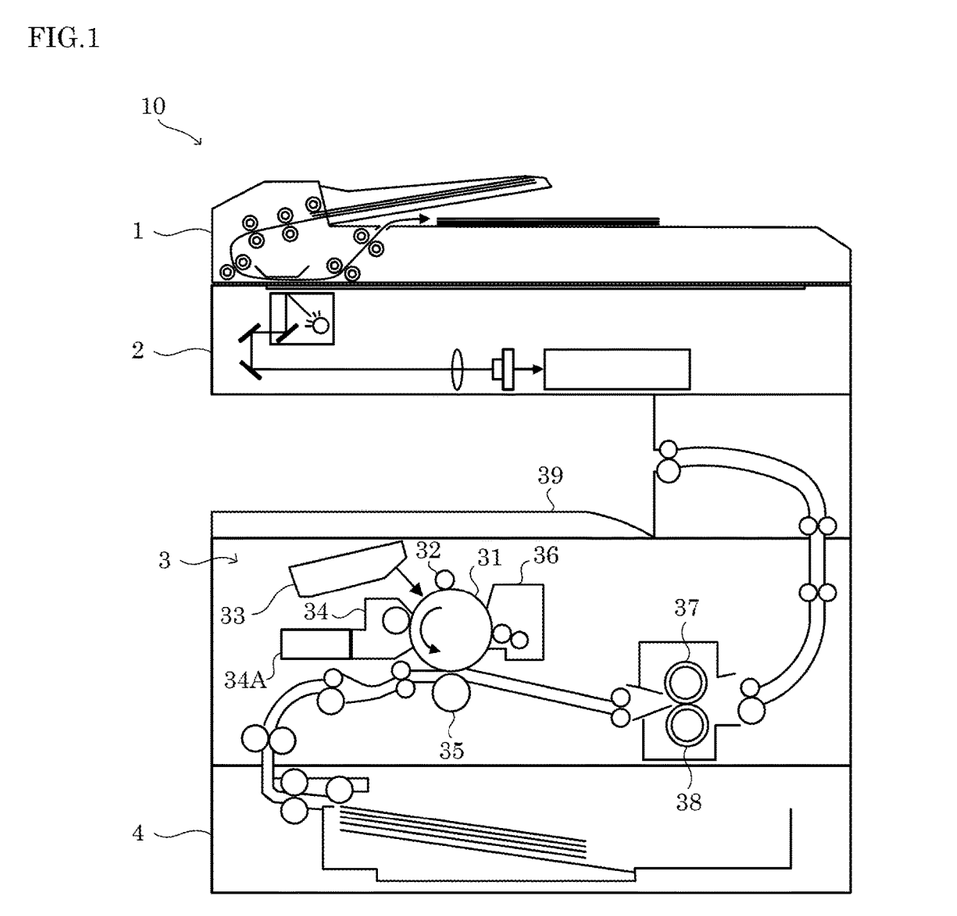
FIG. 1 is a diagram showing a configuration of an image forming apparatus according to an embodiment of the present disclosure.
Figure 2:
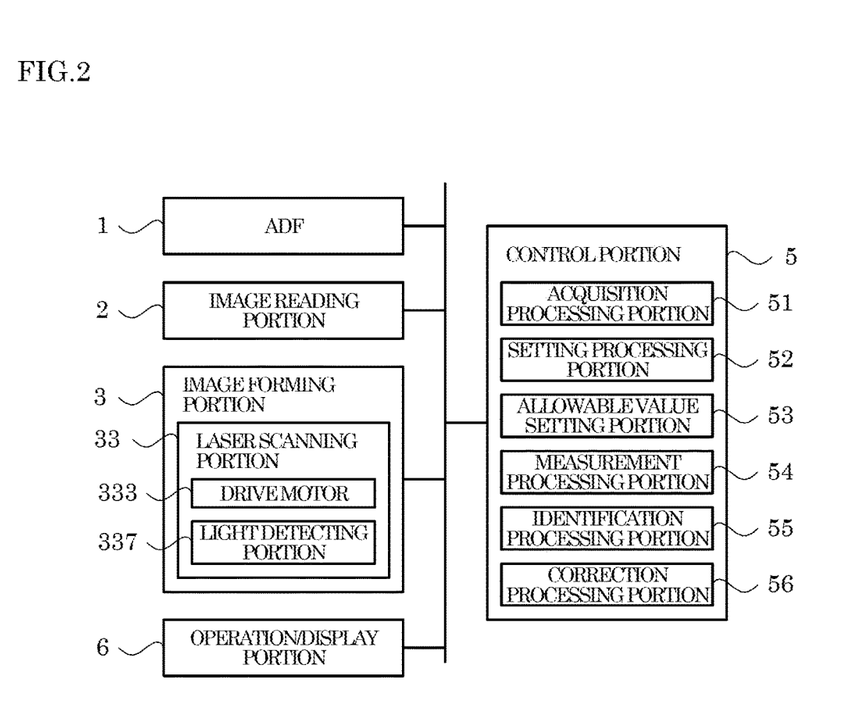
FIG. 2 is a block diagram showing a system configuration of the image forming apparatus according to the embodiment of the present disclosure.

As shown in FIG. 1 and FIG. 2, the image forming apparatus 10 includes an ADF 1, an image reading portion 2, an image forming portion 3, a sheet feed portion 4, a control portion 5, and an operation/display portion 6.

The ADF 1 is an automatic document feeding device that includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD (Charge Coupled Device), and is configured to read image data from a document sheet.

The image forming portion 3 is configured to execute an image forming process (printing process) in which to form an image by the electrophotographic system based on image data read by the image reading portion 2, or image data input from an external information processing apparatus such as a personal computer. Specifically, as shown in FIG. 1, the image forming portion 3 includes a photoconductor drum 31 (an example of the image carrier of the present disclosure), a charging equipment 32, a laser scanning portion 33, a developing equipment 34, a transfer roller 35, a cleaning device 36, a fixing roller 37, a pressure roller 38, and a sheet discharge tray 39.

The sheet feed portion 4 includes a sheet feed cassette and a plurality of conveyance rollers, and supplies sheets stored in the sheet feed cassette, to the image forming portion 3 one by one. It is noted that the sheet is a sheet-like material such as a sheet of paper, a sheet of coated paper, a postcard, an envelope, or an OHP sheet.

In the image forming portion 3, an image is formed in the following procedure on a sheet supplied from the sheet feed portion 4, and the sheet with the image formed thereon is discharged to the sheet discharge tray 39.

First, the charging equipment 32 uniformly charges the surface of the photoconductor drum 31 to a certain potential. Next, the laser scanning portion 33 irradiates light on the surface of the photoconductor drum 31 based on the image data. This allows an electrostatic latent image corresponding to the image data to be formed on the surface of the photoconductor drum 31. The electrostatic latent image on the photoconductor drum 31 is developed (visualized) as a toner image by the developing equipment 34. It is noted that toner (developer) is replenished to the developing equipment 34 from a toner container 34A that is attached to the image forming portion 3 in a detachable manner.

Subsequently, the toner image formed on the photoconductor drum 31 is transferred to the sheet by the transfer roller 35. Thereafter, the sheet is passed through between the fixing roller 37 and the pressure roller 38, during which the sheet is heated by the fixing roller 37, and the toner image transferred to the sheet is fused and fixed to the sheet. It is noted that toner that has remained on the surface of the photoconductor drum 31 is removed by the cleaning device 36.

The control portion 5 includes control equipment such as CPU, ROM, RAM, and EEPROM that are not shown. The CPU is a processor that executes various calculation processes. The ROM is a nonvolatile storage device in which various information such as control programs for causing the CPU to execute various processes are stored in advance. The RAM is a volatile storage device, and is used as a temporary storage memory (working area) for the various processes executed by the CPU. The EEPROM is a nonvolatile storage device. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion is, for example, a liquid crystal display and displays various types of information in response to control instructions from the control portion 5, and the operation portion is, for example, operation keys or a touch panel that inputs various types of information to the control portion 5 in response to user operations.

[Configuration of Laser Scanning Portion 33]

Figure 3:
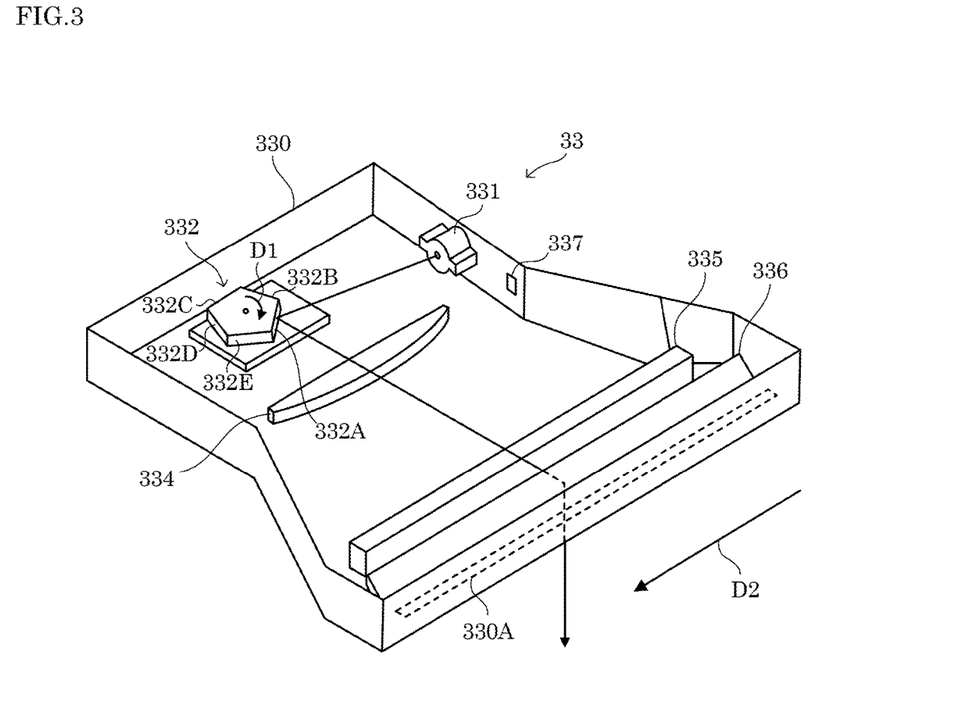
FIG. 3 is a diagram showing a configuration of a laser scanning portion of the image forming apparatus according to the embodiment of the present disclosure.
Figure 4:
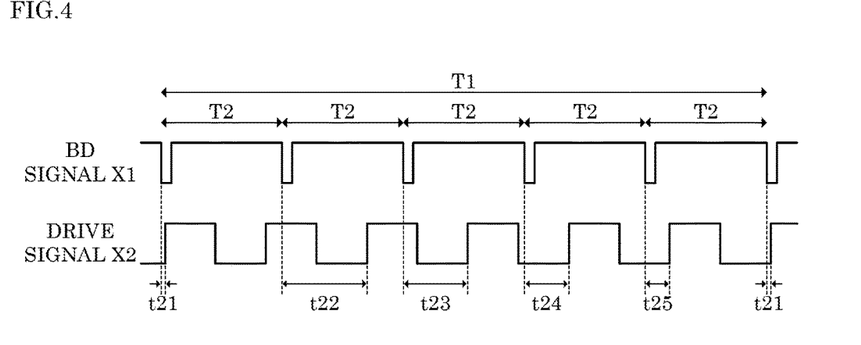
FIG. 4 is a timing chart showing a relationship between a timing at which a BD signal is input, and a timing at which a drive signal is output in the image forming apparatus according to the embodiment of the present disclosure.

Next, the laser scanning portion 33 is described with reference to FIG. 2 to FIG. 5. Here, FIG. 3 is a perspective diagram showing a configuration of the laser scanning portion 33. In addition, FIG. 4 is a timing chart showing a relationship between an input timing at which a light reception signal (hereinafter referred to as a "BD signal") X1 that has been output from a light detecting portion 337 is input to the control portion 5; and an output timing at which a drive signal X2 is output to a drive motor 333 from the control portion 5. In addition, FIG. 5 is a diagram showing a state where the input timing of the BD signal X1 and the output timing of the drive signal X2 is shifted due to environmental variations.

Figure 5:
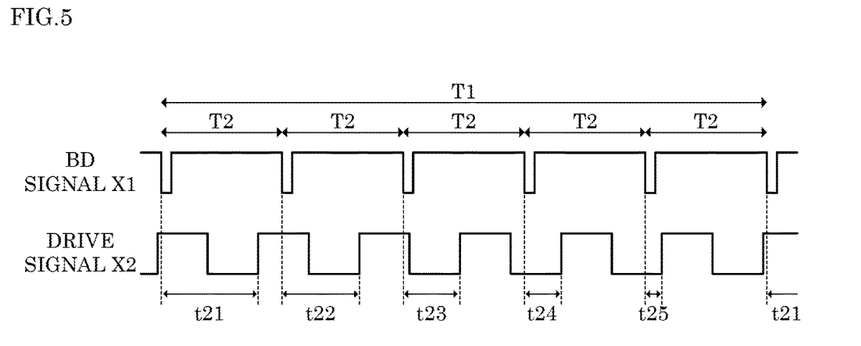
FIG. 5 is a timing chart showing a relationship between a timing at which the BD signal is input, and a timing at which the drive signal is output in the image forming apparatus according to the embodiment of the present disclosure.

It is noted that in FIG. 4 and FIG. 5, the input timing of the BD signal X1 is indicated by a fall of an electric signal (voltage). In addition, in FIG. 4 and FIG. 5, the output timing of the drive signal X2 is indicated by a rise of an electric signal (voltage).

The laser scanning portion 33 forms, on the photoconductor drum 31, an electrostatic latent image corresponding to image data by scanning light over the photoconductor drum 31 in correspondence with the image data.

Specifically, as shown in FIG. 2 and FIG. 3, the optical scanning portion 33 includes a light source 331, a polygon mirror 332, the drive motor 333, an fθ lens 334, an fθ lens 335, a total reflection mirror 336, the light detecting portion 337, a housing 330 that stores these components, and a light-emitting port 330A formed in the housing 330. It is noted that in the image forming portion 3, the laser scanning portion 33 is disposed at a position above the photoconductor drum 31 where a longitudinal direction of the light-emitting port 330A and an axial direction of the photoconductor drum 31 are parallel to each other.

The light source 331 emits light in correspondence with image data. For example, the light source 331 is a laser diode.

The polygon mirror 332 is configured to scan light emitted from the light source 331 onto the photoconductor drum 31. For example, the polygon mirror 332 is regular pentagonal in a plan view as shown in FIG. 3, and includes reflection surfaces 332A to 332E that reflect light emitted from the light source 331.

The polygon mirror 332 rotates in a rotation direction D1 shown in FIG. 3 by a rotational driving force supplied from the drive motor 333. With this configuration, the light is scanned by the reflection surfaces 332A to 332E in sequence as the polygon mirror 332 rotates. Here, the polygon mirror 332 is an example of the rotary polygon mirror of the present disclosure.

The drive motor 333 causes the polygon mirror 332 to rotate by supplying the rotational driving force to the polygon mirror 332. Specifically, the drive motor 333 is a stepping motor. The drive motor 333 rotates at a speed that corresponds to a frequency of the drive signal X2 (see FIG. 4) that is input from the control portion 5.

The fθ lenses 334 and 335 convert light that is scanned by the polygon mirror 332 at a constant angular speed to light that is scanned at a constant speed along a scanning direction D2 (see FIG. 3). The total reflection mirror 336 reflects light that has passed through the fθ lens 335, toward the surface of the photoconductor drum 31. The light-emitting port 330A includes an elongated opening through which the light reflected by the total reflection mirror 336 is emitted toward the surface of the photoconductor drum 31. The light-emitting port 330A also includes a transparent glass plate or acrylic plate closing the opening.

The light detecting portion 337 detects light scanned by the polygon mirror 332, at a predetermined detection position inside a scanning area in which the polygon mirror 332 scans the light. For example, the light detecting portion 337 is an optical sensor that includes a light receiving portion. For example, the detection position is located on the upstream side in the scanning direction D2, so as not to be reflected by the total reflection mirror 336. The light detecting portion 337 outputs the BD signal X1 (see FIG. 4), upon detecting light scanned by the polygon mirror 332.

The BD signal X1 output from the light detecting portion 337 is input to the control portion 5. Based on the input timing of the BD signal X1, the control portion 5 determines a timing for the light source 331 to emit light in correspondence with one line of the image data, namely, a timing to write an electrostatic latent image in the scanning direction D2.

Here, the drive motor 333 includes magnetic poles of a number that is mutually prime to and larger than the number of the reflection surfaces of the polygon mirror 332. As a result, in the image forming apparatus 10, as shown in FIG. 4, at least one drive signal X2 is output from the control portion 5 in each detection cycle T2 when light is detected by the light detecting portion 337 (each input cycle of the BD signal X1 to the control portion 5). In addition, in the image forming apparatus 10, as shown in FIG. 4, detection cycles T2 in a rotation cycle T1 of the polygon mirror 332 are different from each other in interval between a detection timing at which light is detected by the light detecting portion 337 (an input timing when the BD signal X1 is input to the control portion 5) and an output timing when the drive signal X2 is output to the drive motor 333 first after the detection timing.

Meanwhile, there is known a conventional technique configured to identify a reflection surface of the polygon mirror 332 based on the detection timing and the output timing of the drive signal X2. Specifically, it is monitored in each of predetermined division periods in a detection cycle T2 whether or not the drive signal X2 is output, and the reflection surface of the polygon mirror is identified based on whether or not output of the drive signal X2 was detected in a certain division period that corresponds to a certain reflection surface, or in any of division periods before and after the certain division period. This makes it possible to identify a reflection surface of the polygon mirror 332 even in a case where the interval between the detection timing and the drive signal X2 output timing has been shifted due to environmental variations.

However, according to the conventional technique, it is necessary to store, in a memory, a result of monitoring an output of the drive signal X2 at least for three division periods, and it is necessary to update the monitoring result data stored in a storage area of the memory each time the division period passes. That is, the data stored in the storage area of the memory is updated as many times as the number of the division periods in each detection cycle T2. This shortens the life of the memory of the image forming apparatus 10. On the other hand, according to the image forming apparatus 10 of the embodiment of the present disclosure, it is possible to reduce the number of updates of the memory, and identify a reflection surface of the polygon mirror 332 while allowing the shift of the detection interval that is generated due to environmental variations.

Specifically, a reflection surface identification program for causing the CPU to execute a standard interval setting process (see the flowchart of FIG. 6) and a reflection surface identification process (see the flowchart of FIG. 7) that are described below, is stored in advance in the ROM of the control portion 5. It is noted that the reflection surface identification program may be recorded on a computer-readable recording medium such as a CD, a DVD, or a flash memory, and may be installed from the recording medium to a storage device, such as the EEPROM, of the control portion 5.

As shown in FIG. 2, the control portion 5 includes an acquisition processing portion 51, a setting processing portion 52, an allowable value setting portion 53, a measurement processing portion 54, an identification processing portion 55, and a correction processing portion 56. Specifically, the control portion 5 executes the reflection surface identification program stored in the ROM by using the CPU. This allows the control portion 5 to function as the acquisition processing portion 51, the setting processing portion 52, the allowable value setting portion 53, the measurement processing portion 54, the identification processing portion 55, and the correction processing portion 56. Here, a device that includes the laser scanning portion 33 and the control portion 5 is an example of the laser scanning device of the present disclosure The acquisition processing portion 51 acquires an interval between the detection timing at which light is detected by the light detecting portion 337 and the output timing at which the drive signal X2 is output to the drive motor 333 first after the detection timing, in each of the detection cycles T2 that respectively correspond to the reflection surfaces 332A to 332E of the polygon mirror 332.

For example, the acquisition processing portion 51 causes the light source 331 to emit light and outputs the drive signal X2 to the drive motor 333 so that the drive motor 333 rotates at a predetermined standard speed.

In addition, the acquisition processing portion 51 identifies the reflection surfaces 332A to 332E that correspond to the detection cycles T2. For example, in the image forming apparatus 10, when the polygon mirror 332 is assembled to the laser scanning portion 33, the reflection surfaces 332A to 332E are respectively arranged at predetermined positions. With this configuration, at the first driving of the drive motor 333, the acquisition processing portion 51 can identify the reflection surfaces 332A to 332E corresponding to the detection cycles T2, by counting the number of clocks of the drive signal X2 that is input to the drive motor 333. It is noted that after the setting processing portion 52 sets the standard interval, the acquisition processing portion 51 causes the identification processing portion 55 to identify the reflection surfaces 332A to 332E corresponding to the detection cycles T2.

The acquisition processing portion 51, in each of the detection cycles T2 corresponding to the identified reflection surfaces 332A to 332E, acquires, by measuring, the interval between the detection timing at which light is detected by the light detecting portion 337 and the output timing at which the drive signal X2 is output to the drive motor 333 first after the detection timing.

The setting processing portion 52 sets one among a plurality of intervals, excluding the shortest interval and the longest interval, to a standard interval, wherein the plurality of intervals are acquired by the acquisition processing portion 51 in the detection cycles T2 that respectively correspond to the reflection surfaces 332A to 332E of the polygon mirror 332, the standard interval is used to identify each reflection surface of the polygon mirror 332, and each of the plurality of intervals is an interval between the detection timing at which light is detected by the light detecting portion 337 and the output timing at which the drive signal X2 is output to the drive motor 333 first after the detection timing.

For example, the setting processing portion 52 sets the standard interval by storing, in a predetermined storage area in the EEPROM, one among the plurality of intervals, excluding the shortest interval and the longest interval, that are acquired by the acquisition processing portion 51 in the detection cycles T2 that respectively correspond to the reflection surfaces 332A to 332E of the polygon mirror 332, each of the plurality of intervals being an interval between the detection timing and the output timing at which the drive signal X2 is output to the drive motor 333 first after the detection timing.

It is noted that in the image forming apparatus 10, the control portion 5 may not include the acquisition processing portion 51 and the setting processing portion 52. For example, a plurality of intervals may be measured by a manufacturing worker of the image forming apparatus 10 in advance by using a tool or the like in the detection cycles T2 that respectively correspond to the reflection surfaces 332A to 332E of the polygon mirror 332, and one of the measured intervals may be stored in a predetermined storage area in the EEPROM, each of the plurality of intervals being an interval between the detection timing and the output timing at which the drive signal X2 is output to the drive motor 333 first after the detection timing.

The allowable value setting portion 53 sets an allowable value that is used to identify a reflection surface of the polygon mirror 332, based on a difference between two intervals acquired in two successive detection cycles T2, wherein each of the two intervals is an interval between the detection timing at which light is detected by the light detecting portion 337 and the output timing at which the drive signal X2 is output to the drive motor 333 first after the detection timing.

For example, the allowable value setting portion 53 calculates a difference between two intervals acquired by the acquisition processing portion 51 in two successive detection cycles T2, wherein each of the two intervals is an interval between the detection timing and the output timing at which the drive signal X2 is output to the drive motor 333 first after the detection timing. The allowable value setting portion 53 sets the allowable value by calculating the allowable value by subtracting a predetermined correction value from the calculated difference, and storing the calculated allowable value in a predetermined storage area in the EEPROM.

For example, the correction value is a quantization error in the sampling, an amount of variation of the interval between the detection timing and the output timing of the drive signal X2 that is caused due to a temperature change, or an amount of variation of the interval between the detection timing and the output timing of the drive signal X2 that is caused due to a temporal change.

It is noted that in the image forming apparatus 10, the control portion 5 may not include the allowable value setting portion 53. For example, a predetermined allowable value may be stored in advance in a predetermined storage area in the EEPROM.

The measurement processing portion 54 measures an interval between the detection timing at which light is detected by the light detecting portion 337 and the output timing at which the drive signal X2 that is to be input to the drive motor 333 first after the detection timing, is output, in each of the detection cycles T2 in which light is detected by the light detecting portion 337.

For example, each time a predetermined timing comes, the measurement processing portion 54 starts to cause the light source 331 to emit light, and input the drive signal X2 to the drive motor 333 to rotate the drive motor 333 at the standard speed. The measurement processing portion 54 then measures, in each of the detection cycles T2, the interval between the detection timing and the output timing at which the drive signal X2 is output to the drive motor 333 first after the detection timing. It is noted that the predetermined timing is, for example, when the image forming apparatus 10 is powered on, when the image forming apparatus 10 returns to a normal state from a sleep state where some functions of the image forming apparatus 10 stop, and when the printing process is executed.

The identification processing portion 55 identifies a reflection surface of the polygon mirror 332 that corresponds to a predetermined standard interval based on the standard interval and an measured interval measured by the measurement processing portion 54.

For example, in a case where a difference between the measured interval and the standard interval is smaller than the allowable value set by the allowable value setting portion 53, the identification processing portion 55 identifies, as the reflection surface that corresponds to the standard interval, a reflection surface that reflects light emitted from the light source 331 in a detection cycle T2 that corresponds to the measured interval.

It is noted that the measurement processing portion 54 may cause the drive motor 333 to rotate at a speed that is different from the standard speed, and measure, at each of the detection cycles T2, the interval between the detection timing and the output timing at which the drive signal X2 is output to the drive motor 333 first after the detection timing.

In the above-mentioned case, the identification processing portion 55 may identify a reflection surface that corresponds to the standard interval, based on a standard scanning position and a measured scanning position, wherein the standard scanning position is a position on the photoconductor drum 31 that is acquired based on the standard interval and a rotation speed (the standard speed) of the drive motor 333 corresponding to the standard interval, and the measured scanning position is a position on the photoconductor drum 31 that is acquired based on the measured interval and a rotation speed (a speed different from the standard speed) of the drive motor 333 at the time when the measured interval is measured by the measurement processing portion 54. In addition, the setting processing portion 52 may store, in the EEPROM, the standard scanning position in place of the standard interval. In addition, the allowable value setting portion 53 may convert the allowable value into a distance on the photoconductor drum 31 in the scanning direction D2 in which light is scanned by the laser scanning portion 33, and store the distance in the EEPROM.

In addition, in a case where the measured interval is smaller than a total of the standard interval and a predetermined first allowable value, and exceeds a value that is obtained by subtracting a second allowable value that is different from the first allowable value, from the standard interval, the identification processing portion 55 may determine, as the reflection surface corresponding to the standard interval, a reflection surface that reflects light that is emitted from the light source 331 in a detection cycle T2 that corresponds to the measured interval.

The correction processing portion 56 corrects image data input to the laser scanning portion 33, based on the result of identification of a reflection surface by the identification processing portion 55. For example, in the image forming apparatus 10, a plurality of pieces of correction data that respectively correspond to the reflection surfaces 332A to 332E of the polygon mirror 332 are stored in the ROM of the control portion 5 in advance. The correction processing portion 56 corrects each line of image data corresponding to the reflection surfaces 332A to 332E, based on the correction data read from the ROM.

[Standard Interval Setting Process]

Figure 6:
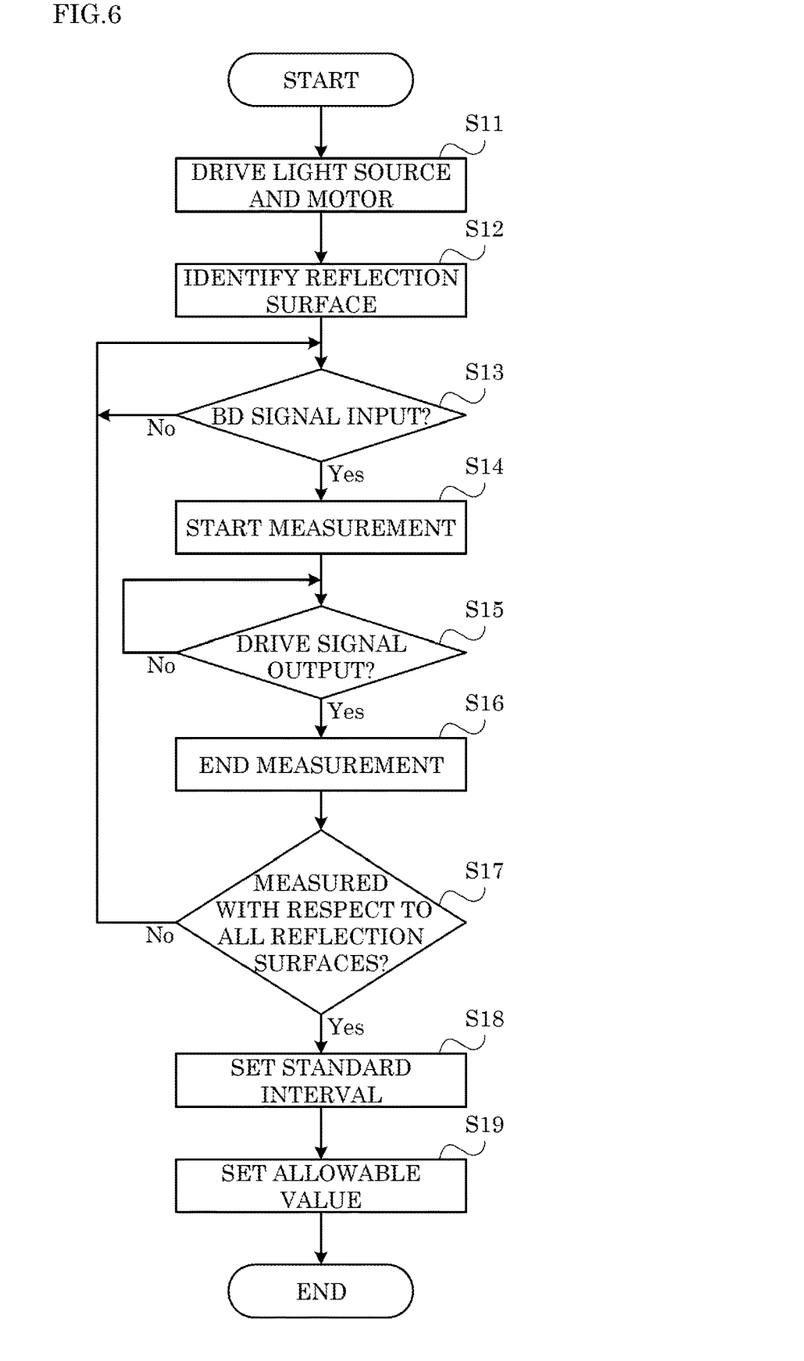
FIG. 6 is a flowchart showing an example of a standard interval setting process executed in the image forming apparatus according to the embodiment of the present disclosure.

In the following, with reference to FIG. 6, a description is given of an example of the procedure of the standard interval setting process executed by the control portion 5 in the image forming apparatus 10. Here, steps S11, S12, . . . represent numbers assigned to the processing procedures (steps) executed by the control portion 5. It is noted that the standard interval setting process is executed in response to a user operation performed on the operation/display portion 6. For example, the standard interval setting process is executed in response to an operation performed on the operation/display portion 6 by a manufacturing worker of the image forming apparatus 10 before the shipment of the image forming apparatus 10. It is noted that the standard interval setting process may be executed in response to an operation performed on the operation/display portion 6 by a maintenance worker of the image forming apparatus 10 after the shipment of the image forming apparatus 10.

<Step S11>

First, in step S11, the control portion 5 causes the light source 331 to emit light and outputs the drive signal X2 to the drive motor 333 to rotate the drive motor 333 at the standard speed.

<Step S12>

In step S12, the control portion 5 identifies a reflection surface of the polygon mirror 332 that reflects the light emitted from the light source 331. For example, the control portion 5 identifies a reflection surface of the polygon mirror 332 that reflects the light emitted from the light source 331, by counting the number of clocks of the drive signal X2 that is input to the drive motor 333.

It is noted that in a case where the standard interval is stored in the EEPROM in advance, the control portion 5 identifies a reflection surface of the polygon mirror 332 that reflects light emitted from the light source 331, by executing the processes of steps S23 to S28 of the reflection surface identification process that is described below.

<Step S13>

In step S13, the control portion 5 determines whether or not the BD signal X1 has been input from the light detecting portion 337.

Here, upon determining that the BD signal X1 has been input from the light detecting portion 337 (Yes side at S13), the control portion 5 moves the process to step S14. In addition, upon determining that the BD signal X1 has not been input from the light detecting portion 337 (No side at S13), the control portion 5 waits at step S13 for the BD signal X1 to be input from the light detecting portion 337.

<Step S14>

In step S14, the control portion 5, in a detection cycle T2 that corresponds to the reflection surface identified in step S12, starts measuring an interval between the detection timing at which light is detected by the light detecting portion 337 (when the BD signal X1 is input in step S13) and the output timing at which the drive signal X2 is output to the drive motor 333 first after the detection timing.

<Step S15>

In step S15, the control portion 5 determines whether or not the drive signal X2 has been output.

Here, upon determining that the drive signal X2 has been output (Yes side at S15), the control portion 5 moves the process to step S16. In addition, upon determining that the drive signal X2 has not been output (No side at S15), the control portion 5 waits at step S15 for the drive signal X2 to be output.

<Step S16>

In step S16, the control portion 5 ends the measurement that was started in step S14.

<Step S17>

In step S17, the control portion 5 determines whether or not the interval between the detection timing and the output timing at which the drive signal X2 is output to the drive motor 333 first after the detection timing, has been measured with respect to all the reflection surfaces of the polygon mirror 332.

Here, upon determining that the interval has been measured with respect to all the reflection surfaces of the polygon mirror 332 (Yes side at S17), the control portion 5 moves the process to step S18. In addition, upon determining that the interval has not been measured with respect to all the reflection surfaces of the polygon mirror 332 (No side at S17), the control portion 5 moves the process to step S13, and executes the processes of steps S13 to S16. Here, the processes of steps S11 to S17 are executed by the acquisition processing portion 51 of the control portion 5.

<Step S18>

In step S18, the control portion 5 sets the standard interval. Here, the process of step S18 is executed by the setting processing portion 52 of the control portion 5.

Specifically, the control portion 5 sets the standard interval by storing, in a predetermined storage area in the EEPROM, one among a plurality of intervals, excluding the shortest interval and the longest interval, that were acquired in the processes of steps S11 to S17 in the detection cycles T2 that respectively correspond to the reflection surfaces 332A to 332E of the polygon mirror 332, wherein each of the plurality of intervals is an interval between the detection timing at which light is detected by the light detecting portion 337 and the output timing at which the drive signal X2 is output to the drive motor 333 first after the detection timing.

For example, in a case where intervals t21 to t25 shown in FIG. 4 were acquired in the processes of steps S11 to S17, the control portion 5 sets one of the intervals t23, t24 and t25 to the standard interval, excluding the shortest interval t21 and the longest interval t22. This makes it possible to avoid becoming incapable of identifying a reflection surface even when the interval between the BD signal X1 input timing and the drive signal X2 output timing is shifted from the state shown in FIG. 4 to the state shown in FIG. 5 due to environmental variations.

For example, if the interval t21 shown in FIG. 4 is set to the standard interval, and the interval between the BD signal X1 input timing and the drive signal X2 output timing is shifted as shown in FIG. 5 due to environmental variations, the interval t21 varies in excess of the allowable value, and it becomes incapable of identifying a reflection surface.

Furthermore, in a case where intervals t21 to t25 shown in FIG. 5 were acquired in the processes of steps S11 to S17, the control portion 5 sets one of the intervals t22, t23 and t24 to the standard interval, excluding the shortest interval t25 and the longest interval t21. This makes it possible to avoid becoming incapable of identifying a reflection surface even when the interval between the BD signal X1 input timing and the drive signal X2 output timing is shifted from the state shown in FIG. 5 to the state shown in FIG. 4 due to environmental variations.

For example, if the interval t21 shown in FIG. 5 is set to the standard interval, and the interval between the BD signal X1 input timing and the drive signal X2 output timing is shifted as shown in FIG. 4 due to environmental variations, the interval t21 varies in excess of the allowable value, and it becomes incapable of identifying a reflection surface.

Accordingly, in the image forming apparatus 10, it is not necessary to store, in a memory, a result of monitoring an output of the drive signal X2 for three division periods, and update the monitoring result data stored in a storage area of the memory each time the division period passes, as in the conventional technique.

<Step S19>

In step S19, the control portion 5 sets the allowable value. Here, the process of step S19 is executed by the allowable value setting portion 53 of the control portion 5.

For example, the control portion 5 calculates a difference between two intervals acquired in two successive detection cycles T2 in the processes of steps S11 to S17, wherein each of the two intervals is an interval between the detection timing at which light is detected by the light detecting portion 337 and the output timing at which the drive signal X2 is output to the drive motor 333 first after the detection timing. The control portion 5 then sets the allowable value by calculating the allowable value by subtracting the correction value from the calculated difference, and storing the calculated allowable value in a predetermined storage area in the EEPROM.

It is noted that the process of step S19 may be executed each time the reflection surface identification process that is described below, is executed. For example, the control portion 5 may store, in the EEPROM, a difference between two intervals acquired in two successive detection cycles T2 in the processes of steps S11 to S17, wherein each of the two intervals is an interval between the detection timing at which light is detected and the output timing at which the drive signal X2 is output to the drive motor 333 first after the detection timing. Subsequently, each time the reflection surface identification process is executed, the control portion 5 may acquire, from the ROM or the like, a correction value corresponding to, for example, the temperature at that time and the number of sheets to be printed, and set the allowable value based on the acquired correction value and the difference between the two intervals acquired in the two successive detection cycles T2 that has been stored in the EEPROM.

In the image forming apparatus 10, the standard interval setting process may not be executed.

[Reflection Surface Identification Process]

Figure 7:
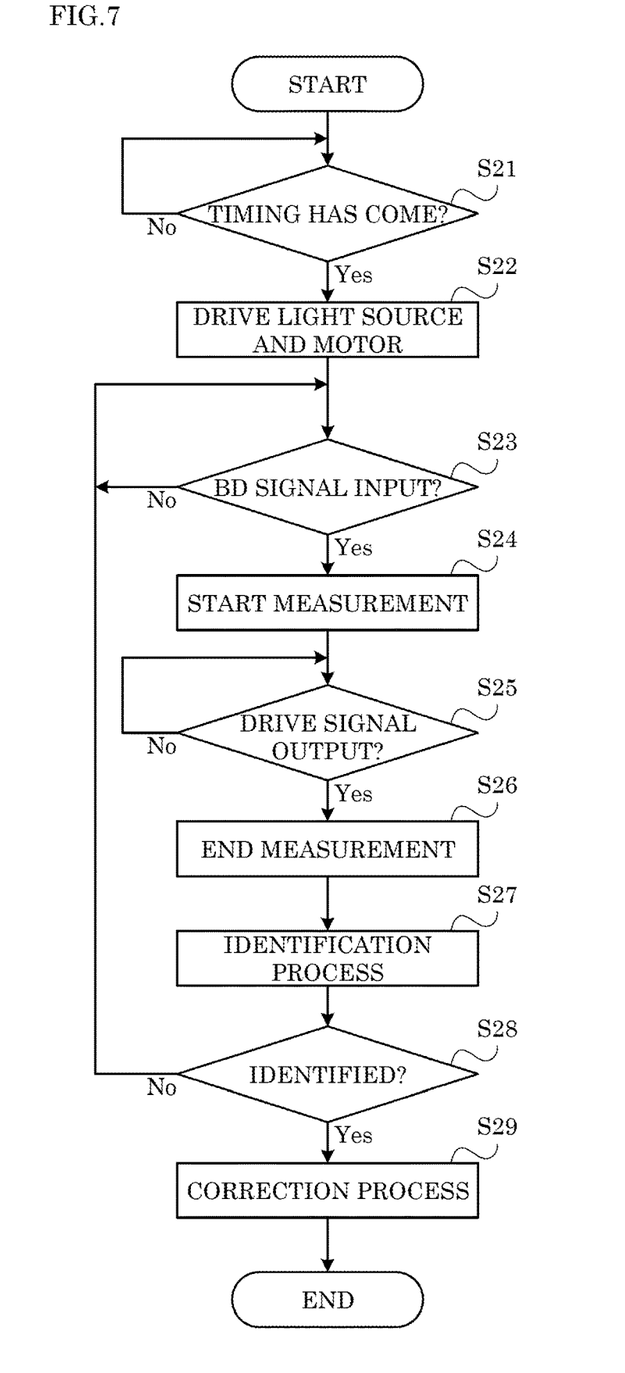
FIG. 7 is a flowchart showing an example of a reflection surface identification process executed in the image forming apparatus according to the embodiment of the present disclosure.

Next, with reference to FIG. 7, a description is given of an example of the procedure of the reflection surface identification process executed by the control portion 5 in the image forming apparatus 10.

<Step S21>

First, in step S21, the control portion 5 determines whether or not the predetermined timing has come.

Here, upon determining that the predetermined timing has come (Yes side at S21), the control portion 5 moves the process to step S22. In addition, upon determining that the predetermined timing has not come (No side at S21), the control portion 5 waits at step S21 for the timing to come.

<Step S22>

In step S22, as in step S11 of the standard interval setting process, the control portion 5 causes the light source 331 to emit light and inputs the drive signal X2 to the drive motor 333 to rotate the drive motor 333 at the standard speed.

<Step S23>

In step S23, the control portion 5 determines whether or not the BD signal X1 has been input from the light detecting portion 337.

Here, upon determining that the BD signal X1 has been input from the light detecting portion 337 (Yes side at S23), the control portion 5 moves the process to step S24. In addition, upon determining that the BD signal X1 has not been input from the light detecting portion 337 (No side at S21), the control portion 5 waits at step S23 for the BD signal X1 to be input from the light detecting portion 337.

<Step S24>

In step S24, the control portion 5 starts measuring an interval between the detection timing at which light is detected by the light detecting portion 337 (when the BD signal X1 is input in step S23) and the output timing at which the drive signal X2 is output to the drive motor 333 first after the detection timing.

<Step S25>

In step S25, the control portion 5 determines whether or not the drive signal X2 has been output.

Here, upon determining that the drive signal X2 has been output (Yes side at S25), the control portion 5 moves the process to step S26. In addition, upon determining that the drive signal X2 has not been output (No side at S25), the control portion 5 waits at step S25 for the drive signal X2 to be output.

<Step S26>

In step S26, the control portion 5 ends the measurement that was started in step S24. Here, the processes of steps S21 to S26 are an example of the measurement step of the present disclosure, and are executed by the measurement processing portion 54 of the control portion 5.

<Step S27>

In step S27, the control portion 5 identifies a reflection surface of the polygon mirror 332 that corresponds to a predetermined standard interval based on the standard interval and an measured interval measured in the process of step S26. Here, the process of step S27 is an example of the identification step of the present disclosure, and is executed by the identification processing portion 55 of the control portion 5.

Specifically, in a case where a difference between the measured interval and the standard interval is smaller than the allowable value, the control portion 5 identifies a reflection surface that reflects light emitted from the light source 331 in a detection cycle T2 that corresponds to the measured interval, as the reflection surface that corresponds to the standard interval.

<Step S28>

In step S28, the control portion 5 determines whether or not a reflection surface of the polygon mirror 332 that corresponds to the standard interval has been identified in step S27.

Here, upon determining that a reflection surface of the polygon mirror 332 that corresponds to the standard interval has been identified in step S27 (Yes side at S28), the control portion 5 moves the process to step S29. In addition, upon determining that a reflection surface of the polygon mirror 332 that corresponds to the standard interval has not been identified in step S27 (No side at S28), the control portion 5 moves the process to step S23. The control portion 5 executes the processes of steps S23 to S27 until a reflection surface of the polygon mirror 332 that corresponds to the standard interval is identified in step S27.

<Step S29>

In step S29, the control portion 5 corrects image data input to the laser scanning portion 33, based on the result of identification of a reflection surface in step S27. Here, the process of step S29 is executed by the correction processing portion 56 of the control portion 5.

For example, the control portion 5 corrects each line of image data corresponding to the reflection surfaces 332A to 332E, based on the correction data read from the ROM. This corrects variations in the degree of unit magnification in the main scanning direction in the print image that are caused by, for example, a surface tilt of the reflection surfaces 332A to 332E of the polygon mirror 332.

As described above, in the image forming apparatus 10, a reflection surface of the polygon mirror 332 is identified based on a predetermined standard interval. In addition, in the image forming apparatus 10, the standard interval is set to one among a plurality of intervals, excluding the shortest interval and the longest interval, that are acquired in the detection cycles T2 that respectively correspond to the reflection surfaces 332A to 332E of the polygon mirror 332, wherein each of the plurality of intervals is an interval between the detection timing at which light is detected by the light detecting portion 337 and the output timing at which the drive signal X2 is output to the drive motor 333 first after the detection timing. This makes it possible to reduce the number of updates of the memory, and identify a reflection surface of the polygon mirror 332 while allowing the shift of the detection interval that is generated due to environmental variations.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning device comprising:
   a light source;
   a rotary polygon mirror having a plurality of reflection surfaces that reflect light emitted from the light source, and configured to rotate such that the light is scanned by the plurality of reflection surfaces in sequence;
   a drive motor having magnetic poles of a number that is mutually prime to and larger than a number of the reflection surfaces, and configured to cause the rotary polygon mirror to rotate;
   a light detecting portion configured to detect the light scanned by the rotary polygon mirror, at a predetermined detection position inside a scanning area in which the rotary polygon mirror scans the light;
   a measurement processing portion configured to, in each of a plurality of detection cycles in which the light is detected by the light detecting portion, measure, as a measured interval, an interval between a detection timing at which the light is detected by the light detecting portion and an output timing at which a drive signal that is to be input to a drive motor first after the detection timing, is output; and
   an identification processing portion configured to identify, from among the plurality of reflection surfaces, a reflection surface that corresponds to a predetermined standard interval, based on the predetermined standard interval and the measured interval, the predetermined standard interval being one of a plurality of intervals, excluding a shortest interval and a longest interval, that are respectively acquired in the plurality of detection cycles that respectively correspond to the plurality of reflection surfaces, each of the plurality of intervals being an interval between the detection timing and the output timing.

2. The laser scanning device according to claim 1, wherein
in a case where a difference between the predetermined standard interval and the measured interval is smaller than a predetermined allowable value, the identification processing portion identifies a reflection surface that reflects light emitted from the light source in a detection cycle that corresponds to the measured interval, as the reflection surface that corresponds to the predetermined standard interval.

3. The laser scanning device according to claim 2, further comprising:
an allowable value setting portion configured to set the allowable value based on a difference between two intervals acquired in two successive detection cycles, wherein each of the two intervals is an interval between the detection timing and the output timing.

4. The laser scanning device according to claim 1, wherein
the identification processing portion identifies the reflection surface that corresponds to the standard interval, based on a standard scanning position and a measured scanning position, the standard scanning position being a position on an image carrier that is acquired based on the standard interval and a rotation speed of the drive motor corresponding to the standard interval, the measured scanning position being a position on the image carrier that is acquired based on the measured interval and a rotation speed of the drive motor at a time when the measured interval is measured by the measurement processing portion.

5. The laser scanning device according to claim 1, further comprising:
an acquisition processing portion configured to acquire an interval between the detection timing and the output timing in each of the detection cycles that respectively correspond to the reflection surfaces; and
a setting processing portion configured to set, to the standard interval, one among a plurality of intervals, excluding a shortest interval and a longest interval, that have been acquired by the acquisition processing portion in the detection cycles that respectively correspond to the reflection surfaces.

6. An image forming apparatus comprising the laser scanning device according to claim 1.

7. A reflection surface identification method executed in a laser scanning device including a light source, a rotary polygon mirror having a plurality of reflection surfaces that reflect light emitted from the light source and configured to rotate such that the light is scanned by the plurality of reflection surfaces in sequence, a drive motor having magnetic poles of a number that is mutually prime to and larger than a number of the reflection surfaces and configured to cause the rotary polygon mirror to rotate, and a light detecting portion configured to detect the light scanned by the rotary polygon mirror, at a predetermined detection position inside a scanning area in which the rotary polygon mirror scans the light, the reflection surface identification method comprising:
a measurement step of, in each of a plurality of detection cycles in which the light is detected by the light detecting portion, measuring, as a measured interval, an interval between a detection timing at which the light is detected by the light detecting portion and an output timing at which a drive signal that is to be input to a drive motor first after the detection timing, is output; and
an identification step of identifying, from among the plurality of reflection surfaces, a reflection surface that corresponds to a predetermined standard interval, based on the predetermined standard interval and the measured interval, the predetermined standard interval being one of a plurality of intervals, excluding a shortest interval and a longest interval, that are respectively acquired in the plurality of detection cycles that respectively correspond to the plurality of reflection surfaces, each of the plurality of intervals being an interval between the detection timing and the output timing.

* * * * *